United States Patent
Ma et al.

(10) Patent No.: US 12,477,592 B2
(45) Date of Patent: Nov. 18, 2025

(54) METHOD FOR DUAL CONNECTIVITY HANDOVER, TERMINAL, AND NETWORK DEVICE

(71) Applicant: VIVO MOBILE COMMUNICATION CO.,LTD., Guangdong (CN)

(72) Inventors: Yue Ma, Chang'an Dongguan (CN); Yumin Wu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 662 days.

(21) Appl. No.: 17/212,720

(22) Filed: Mar. 25, 2021

(65) Prior Publication Data

US 2021/0211951 A1 Jul. 8, 2021

Related U.S. Application Data

(63) Continuation of application No. PCT/CN2019/106672, filed on Sep. 19, 2019.

(30) Foreign Application Priority Data

Sep. 27, 2018 (CN) .......................... 201811134407.8

(51) Int. Cl.
*H04W 36/00* (2009.01)
*H04W 36/08* (2009.01)
*H04W 76/10* (2018.01)

(52) U.S. Cl.
CPC ......... *H04W 76/10* (2018.02); *H04W 36/083* (2023.05); *H04W 36/0069* (2018.08)

(58) Field of Classification Search
CPC . H04W 36/0069; H04W 36/18; H04W 76/10; H04W 76/34
See application file for complete search history.

(56) References Cited

U.S. PATENT DOCUMENTS

2012/0224561 A1 9/2012 Fang et al.
2014/0370897 A1 12/2014 Vesterinen et al.
(Continued)

FOREIGN PATENT DOCUMENTS

CN 1882176 A 12/2006
CN 1997220 A 7/2007
(Continued)

OTHER PUBLICATIONS

Extended European Search Report dated Oct. 22, 2021 as received in Application No. 19867838.5.
(Continued)

*Primary Examiner* — Liton Miah
(74) *Attorney, Agent, or Firm* — BROOKS KUSHMAN P.C.

(57) ABSTRACT

This disclosure discloses a method for dual connectivity handover, a terminal, and a network device. The method includes: receiving a handover command sent from a source node, where the handover command carries dual connectivity DC configuration information for the source node and a target node, and single connectivity SC configuration information for the target node; when the DC configuration information is supported, establishing dual connectivity with the source node and the target node based on the DC configuration information; and based on the SC configuration information, disconnecting the connection with the source node in the dual connectivity and maintaining a single connection with the target node.

20 Claims, 6 Drawing Sheets

(56) References Cited

U.S. PATENT DOCUMENTS

| | | | |
|---|---|---|---|
| 2015/0045035 | A1 | 2/2015 | Nigam et al. |
| 2016/0037579 | A1* | 2/2016 | Jung .................... H04W 24/08 370/252 |
| 2016/0323926 | A1 | 11/2016 | Gao et al. |
| 2016/0337254 | A1* | 11/2016 | Karaki .................... H04L 47/34 |
| 2017/0012887 | A1* | 1/2017 | Ohta ................ H04W 28/0205 |
| 2017/0181044 | A1 | 6/2017 | Wen et al. |
| 2017/0289879 | A1 | 10/2017 | Wang et al. |
| 2018/0035344 | A1 | 2/2018 | Wang |
| 2018/0220336 | A1 | 8/2018 | Hong et al. |
| 2019/0215734 | A1* | 7/2019 | Selvaganapathy ........................... H04W 36/0022 |
| 2020/0351722 | A1* | 11/2020 | Yang .................... H04W 36/08 |

FOREIGN PATENT DOCUMENTS

| | | |
|---|---|---|
| CN | 104301955 A | 1/2015 |
| CN | 104735638 A | 6/2015 |
| CN | 104822169 A | 8/2015 |
| CN | 105992292 A | 10/2016 |
| CN | 107690163 A | 2/2018 |
| CN | 107852653 A | 3/2018 |
| CN | 108112041 A | 6/2018 |
| EP | 3 879 880 A1 | 9/2021 |
| WO | 2014/056163 A1 | 4/2014 |
| WO | 2016/087104 A1 | 6/2016 |
| WO | 2019/192150 A1 | 10/2019 |

OTHER PUBLICATIONS

Japanese Office Action dated Apr. 18, 2022 as received in application No. 2021-517644.
"DC based NR scheme for 0ms interruption handover" 3GPP TSG-RAN WG2 #101 R2-1802473 Athens, Greece, Feb. 26-Mar. 2, 2018 Revision of R2-1800550, Huawei, HiSilicon.
"NR 0ms Interruption HO" 3GPP TSG-RAN WG2 Meeting #101 R2-1803662 Athens, Greece, Feb. 26-Mar. 2, 2018, Qualcomm Incorporated.
Ericsson, "0 ms interruption support during handover procedure in NR," 3GPP TSG-RAN WG2 NR AH#2, R2-1706625, pp. 1-8, (Jun. 29, 2017).
Huawei et al., "DC based NR scheme for 0ms interruption handover," 3GPP TSG-RAN WG2 #99, R2-1708877, pp. 1-7, (Aug. 25, 2017).
ZTE, "Further Consideration on MR-DC Mobility Procedures," 3GPP TSG RAN WG3#1801ad-hoc, R3-180014, pp. 1-12 (Jan. 26, 2018).
Intel Corporation, "New WID: NR mobility enhancements," 3GPP TSG RAN Meeting #80, RP-181433, pp. 1-5, (May 21-25, 2018).
Vivo, "Signalling procedure on DC handover in EUTRAN," 3GPP TSG-RAN WG2 Meeting #103 bis, R2-1814192, pp. 1-4 (Oct. 12, 2018).
Written Opinion of the International Searching Authority dated Apr. 8, 2021 as received in Application No. PCT/CN2019/106672.
CN Office Action dated Aug. 14, 2020 as received in Application No. 201811134407.8.

* cited by examiner

Send a handover command to a terminal, where the handover command carries dual connectivity DC configuration information for a source node and a target node, and single connectivity SC configuration information for the target node — 81
FIG. 8
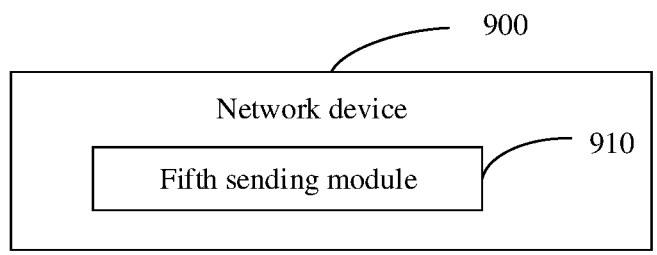
FIG. 9
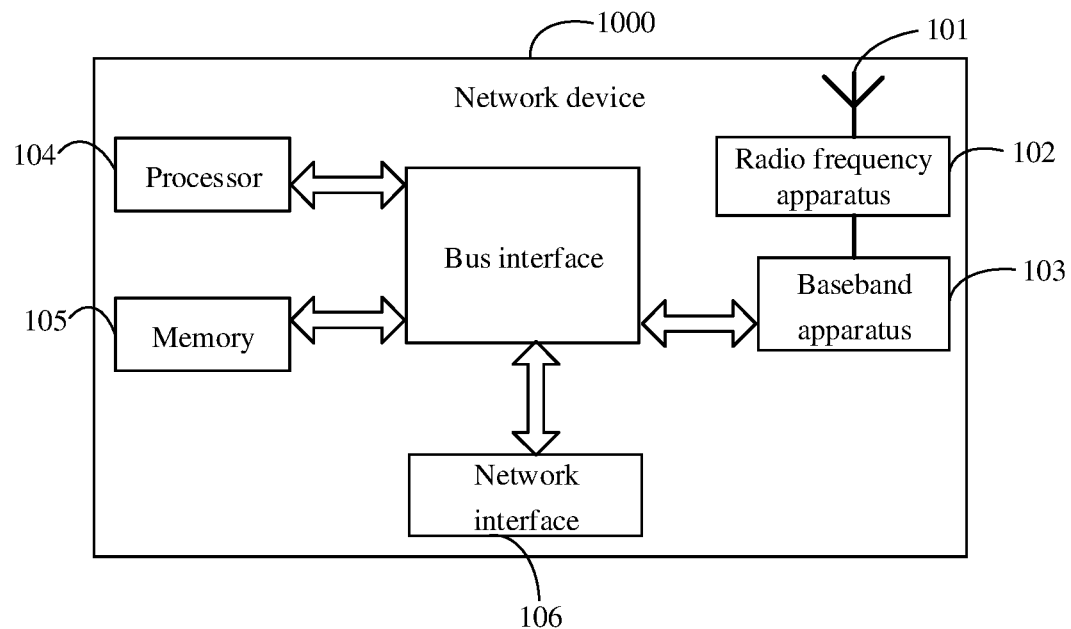
FIG. 10

METHOD FOR DUAL CONNECTIVITY HANDOVER, TERMINAL, AND NETWORK DEVICE

CROSS-REFERENCE TO RELATED APPLICATIONS

This application is a continuation application of PCT Application No. PCT/CN2019/106672 filed on Sep. 19, 2019, which claims priority to Chinese Patent Application No. 201811134407.8, filed in China on Sep. 27, 2018, the disclosures of which are incorporated herein by reference in their entireties.

TECHNICAL FIELD

This disclosure relates to the field of communications technologies, and in particular, to a method for dual connectivity handover, a terminal, and a network device.

BACKGROUND

In a mobile communications system, to ensure that no communication interruption occurs during movement of a terminal, the terminal needs to hand over between cells. At a moment of the handover, UE can only maintain data sending and receiving with a particular network entity. Therefore, data on an air interface will be interrupted during the handover from one network entity to another, and a 0 ms delay requirement cannot be met.

SUMMARY

According to a first aspect, some embodiments of this disclosure provide a method for dual connectivity handover, applied to a terminal side and including:
  receiving a handover command sent from a source node, where the handover command carries dual connectivity DC configuration information for the source node and a target node, and single connectivity SC configuration information for the target node;
  when the DC configuration information is supported, establishing dual connectivity with the source node and the target node based on the DC configuration information; and
  based on the SC configuration information, disconnecting the connection with the source node in the dual connectivity and maintaining a single connection with the target node.

According to a second aspect, some embodiments of this disclosure further provide a terminal, including:
  a first receiving module, configured to receive a handover command sent from a source node, where the handover command carries dual connectivity DC configuration information for the source node and a target node, and single connectivity SC configuration information for the target node;
  a first establishing module, configured to, when the DC configuration information is supported, establish dual connectivity with the source node and the target node based on the DC configuration information; and
  a handover module, configured to, based on the SC configuration information, disconnect the connection with the source node and maintain a single connection with the target node.

According to a third aspect, some embodiments of this disclosure provide a terminal. The terminal includes a processor, a memory, and a computer program stored in the memory and running on the processor. When the computer program is executed by the processor, the steps of the foregoing method for dual connectivity handover are implemented.

According to a fourth aspect, some embodiments of this disclosure provide a method for dual connectivity handover, applied to a network device side, where the network device is a source node, and the method includes:
  sending a handover command to a terminal, where the handover command carries dual connectivity DC configuration information for the source node and a target node, and single connectivity SC configuration information for the target node.

According to a fifth aspect, some embodiments of this disclosure further provide a network device, where the network device is a source node and includes:
  a fifth sending module, configured to send a handover command to a terminal, where the handover command carries dual connectivity DC configuration information for the source node and a target node, and single connectivity SC configuration information for the target node.

According to a sixth aspect, some embodiments of this disclosure further provide a network device, where the network device includes a processor, a memory, and a computer program stored in the memory and running on the processor; and when the computer program is executed by the processor, the steps of the foregoing method for dual connectivity handover are implemented.

According to a seventh aspect, some embodiments of this disclosure provide a non-transitory computer-readable storage medium, where the non-transitory computer-readable storage medium stores a computer program, and when the computer program is executed by a processor, the steps of the foregoing method for dual connectivity handover are implemented.

BRIEF DESCRIPTION OF DRAWINGS

To describe the technical solutions in some embodiments of this disclosure more clearly, the following briefly describes the accompanying drawings required for describing some embodiments of this disclosure. Apparently, the accompanying drawings in the following description show merely some embodiments of this disclosure, and a person of ordinary skill in the art may still derive other drawings from these accompanying drawings without creative efforts.

FIG. 8 is a schematic flowchart of a method for dual connectivity handover on a network device side according to some embodiments of this disclosure;

FIG. 9 is a schematic modular structural diagram of a network device according to some embodiments of this disclosure; and FIG. 10 is a block diagram of a network device according to some embodiments of this disclosure.

DESCRIPTION OF EMBODIMENTS

The following describes example embodiments of this disclosure in more detail with reference to the accompanying drawings. Although the example embodiments of this disclosure are shown in the accompanying drawings, it should be understood that this disclosure may be implemented in various forms and should not be limited by the embodiments set forth herein. On the contrary, the embodiments are provided to enable a more thorough understanding of this disclosure and completely convey the scope of this disclosure to a person skilled in the art.

The terms "first", "second", and the like in this specification and claims of this application are used to distinguish between similar objects instead of describing a specific order or sequence. It should be understood that the data used in this way is interchangeable in appropriate circumstances, so that the embodiments of this application described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, product, or device. "And/or" in the specification and claims represents at least one of connected objects.

To achieve 0 ms interrupt delay in mobility, a terminal is required to maintain connections with a source node and a target node at the same time during movement to ensure data receiving and transmitting. For this purpose, dual connectivity (DC) handover (HO) is introduced. The DC HO process is essentially to establish DC, and then change the DC to single connectivity (SC).

A DC architecture includes a master cell group (MCG) and a secondary cell group (SCG). The MCG corresponds to a master node (MN) on a network device side, and the SCG corresponds to a secondary node (SN) on the network device side. The MCG includes a primary cell (PCell) and a secondary cell (SCell). The SCG includes a primary secondary cell (PSCell) and a secondary cell SCell. The primary cell PCell and the primary secondary cell PSCell may be collectively referred to as a SpCell.

Figure 1:
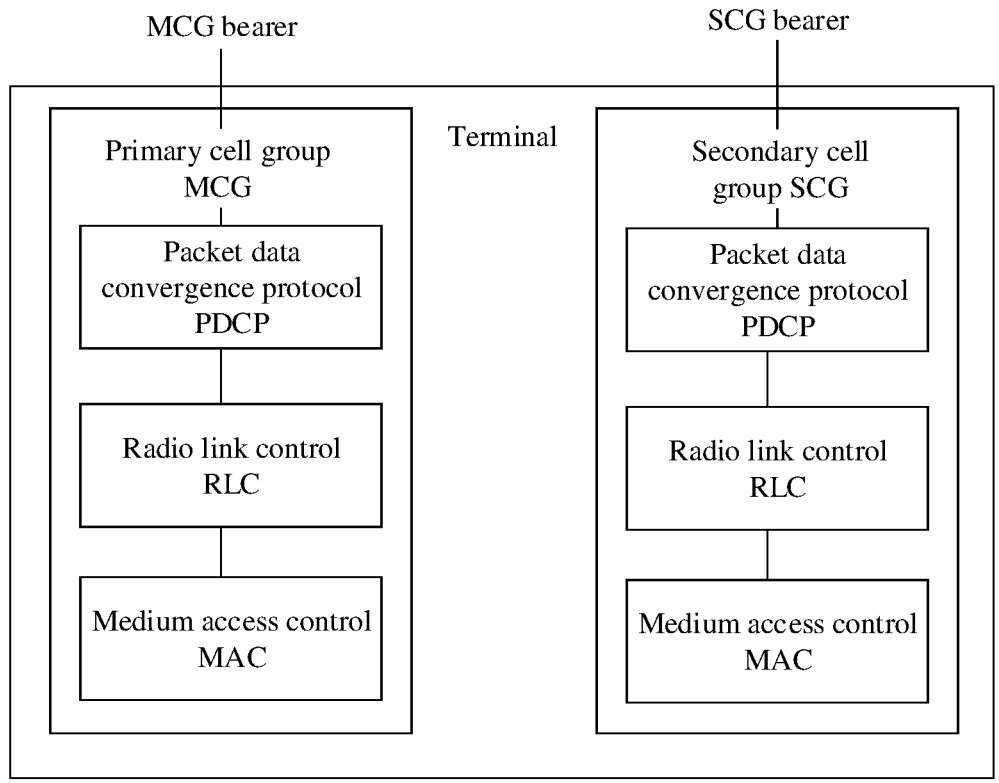
FIG. 1 is a schematic diagram of a network architecture showing an MCG bearer and an SCG bearer.
Figure 2:
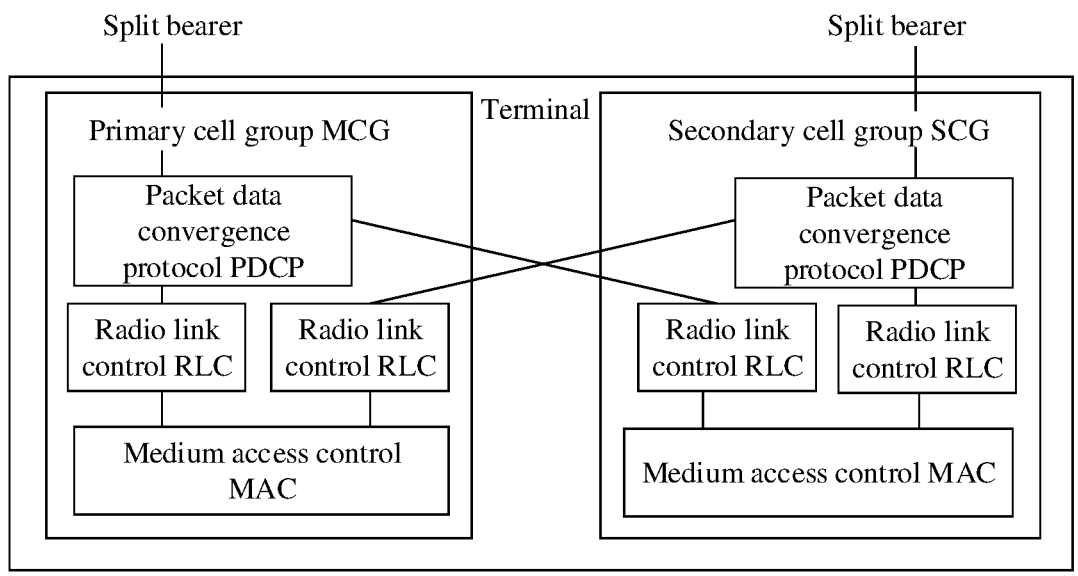
FIG. 2 is a schematic diagram of a network architecture showing split bearers.
Figure 3:
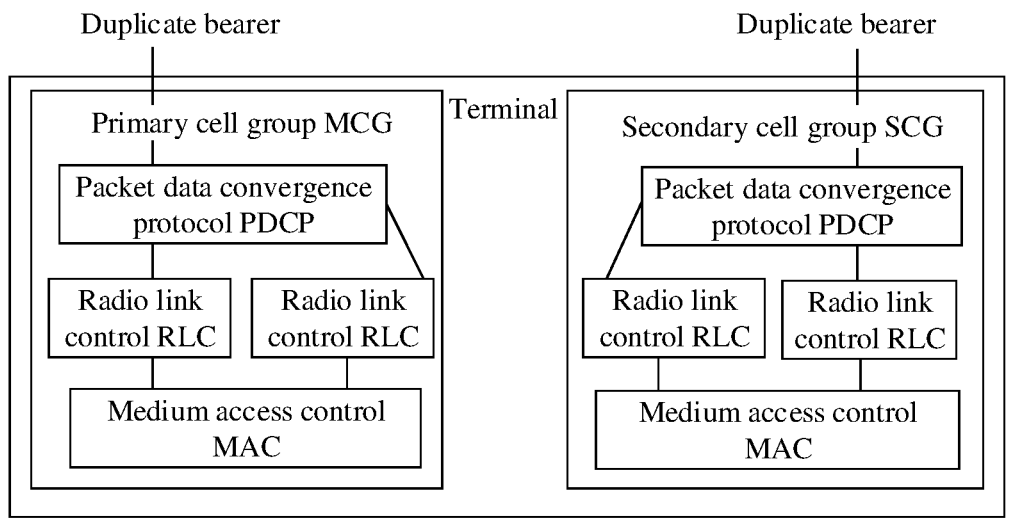
FIG. 3 is a schematic diagram of a network architecture showing duplicate bearers.

Further, the DC architecture supports a packet data convergence protocol (PDCP) duplication function, and also supports different bearer types, including MCG bearer, SCG bearer, split bearer, and duplicate bearer. As shown in FIG. 1, an MCG bearer correspondingly has a PDCP entity, a radio link control (RLC) entity, and a medium access control (MAC) entity. An SCG bearer correspondingly has a PDCP entity, an RLC entity, and a MAC entity. As shown in FIG. 2, for a split bearer, its corresponding PDCP entity is in a cell group, and its corresponding two RLC and two MAC entities are in different cell groups. As shown in FIG. 3, for a duplicate bearer, its corresponding PDCP entity, two RLC and two MAC entities are in a cell group.

Figure 4:
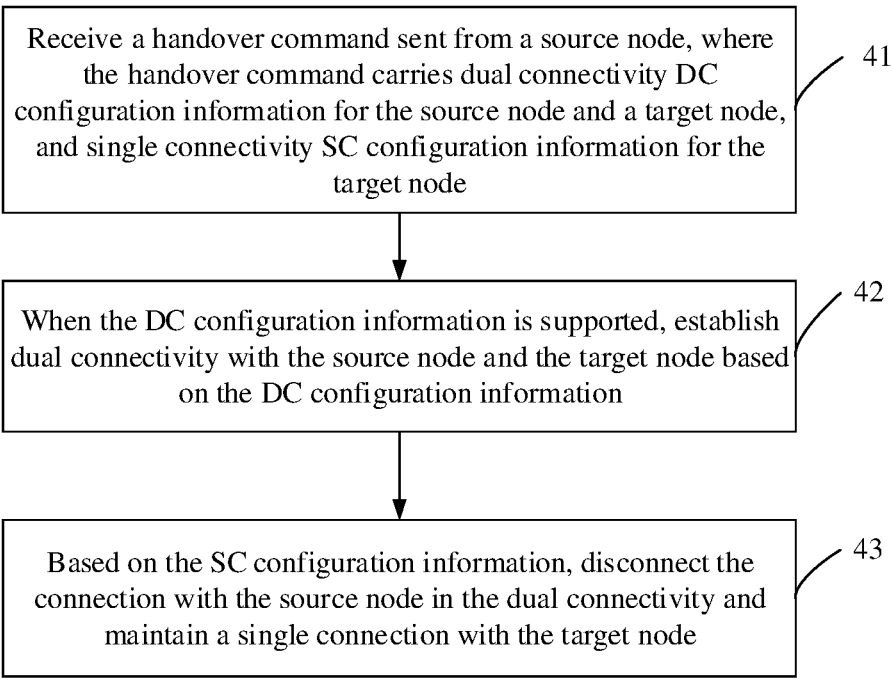
FIG. 4 is a schematic flowchart of a method for dual connectivity handover on a terminal side according to some embodiments of this disclosure.

Some embodiments of this disclosure provide a method for dual connectivity handover, applied to a terminal side. As shown in FIG. 4, the method includes the following steps.

Step 41: Receive a handover command sent from a source node, where the handover command carries dual connectivity DC configuration information for the source node and a target node, and single connectivity SC configuration information for the target node.

The source node (Source) may be a source base station, a source SN in the DC, or a source MN in the DC in a handover process. Correspondingly, when the source node is a source base station, the target node (Target) may be a target base station. When the source node is a source SN or MN in the DC, the target node may be a target SN in the DC. It should be noted that the HO procedure may be initiated by a source SN or a source MN, that is, a handover command may be sent by the source SN or the source MN, but the signaling procedure is the same. A single connection with the target node is a single connection with a target cell.

The handover command is carried in a radio resource control (RRC) reconfiguration message. The RRC reconfiguration message has a first transaction identifier (transaction ID). The first transaction identifier is an ID of the RRC reconfiguration message.

Further, the DC configuration information and/or the SC configuration information in the handover command has a second transaction identifier which is different from the first transaction identifier. To be specific, the DC configuration information and the SC configuration information may have respective second transaction identifiers, or share one second transaction identifier. The second transaction identifier is different from the first transaction identifier of the RRC reconfiguration message.

Step 42: When the DC configuration information is supported, establish dual connectivity with the source node and the target node based on the DC configuration information.

Because the handover command carries the DC configuration information, the terminal may receive and apply the DC configuration information after receiving the handover command. In this process, the source node acts as an MN in the DC, and the target node is added as an SN based on the DC configuration information. After DC configuration is completed, a connection between the terminal and the target node is added, thereby establishing dual connectivity with the source node and the target node. In the process of maintaining dual connectivity, the terminal may receive and transmit data over connections with the source node and the target node, ensuring uninterrupted data transmission.

Step 43: Based on the SC configuration information, disconnect the connection with the source node in the dual connectivity and maintain a single connection with the target node.

Because the handover command also carries the SC configuration information, the terminal changes, after establishing the dual connectivity, the role of the target node to an MN in the DC, disconnects the connection with the source node in the dual connectivity, and only maintains a single connection with the target node applying the SC configuration information. In this way, first, the dual connectivity with the source node and the target node is established based on the DC configuration information, then the connection with the source node in the dual connectivity is disconnected based on the SC configuration information, and only a single connection with the target node is maintained, thereby implementing a process of handing over from the source node to the target node. In the process, the terminal maintains a connection with the network side, and no data transmission interruption occurs, meeting the 0 ms transmission delay requirement.

In some embodiments of this disclosure, after the step 41, the method further includes: when the DC configuration information is not supported, sending to the source node a rejection message indicating that the DC configuration information is rejected, so that the source node performs, based on the rejection message, a procedure for single connectivity handover. After the terminal receives the handover command, the terminal may not support the DC configuration information due to its own capability or other reasons, so the terminal sends to the source node a rejection message indicating that the DC configuration information is rejected. After receiving the rejection message, the source node may perform a procedure for single connectivity handover, that is, a traditional handover procedure. In the single connectivity handover process, the terminal disconnects the connection with the source node, and establishes a connection with the target node. A short delay for data transmission may exist in the process.

After the step 41, the method further includes: sending first confirmation information to the source node based on the handover command, where the first confirmation information is used to confirm at least one of the following:
whether the handover command is received,
whether the DC configuration information is valid,
whether the SC configuration information is valid,
whether the dual connectivity is established, and
whether the SC configuration information is applied.

The first confirmation information may confirm only one of the above information. For example, the terminal feeds back to the source node a positive acknowledgment (ACK) when receiving the handover command, or a negative acknowledgment (NACK) when not receiving the handover command. Alternatively, when the terminal detects that the DC configuration information/SC configuration information is valid, that is, the terminal capability supports various configuration parameters in the DC configuration information/SC configuration information, the terminal feeds back an ACK to the source node. When detecting that the DC configuration information/SC configuration information is invalid, that is, the terminal capability does not support at least one of the configuration parameters in the DC configuration information/SC configuration information, the terminal feeds back a NACK to the source node. Alternatively, the terminal feeds back an ACK to the source node when successfully establishing dual connectivity with the source node and the target node; and feeds back a NACK to the source node when the dual connectivity establishment fails. Alternatively, the terminal feeds back an ACK to the source node when successfully applying the SC configuration information, that is, the terminal may establish a single connection with the target node; and feeds back a NACK to the source node when the terminal fails to apply the SC configuration information.

The first confirmation information may jointly confirm any combination of the above information. For example, the first confirmation information jointly confirms whether the handover command is received and whether the DC configuration information is valid. Other combinations of the above information may also be jointly confirmed by the first confirmation information, and are not exhaustively illustrated herein.

It should be noted that for different information that may be confirmed by the first confirmation information, their feedback occasions are different. For example, when the first confirmation information only confirms whether the handover command is received, an occasion for sending the first confirmation information occurs after the step 41. When the first confirmation information is used to jointly confirm whether the handover command is received and whether the dual connectivity is established, an occasion for sending the first confirmation information occurs after the step 42.

Furthermore, in addition to the foregoing joint confirmation by the first confirmation information, a variety of the above information may be confirmed through their respective confirmation information. For example, after the step 41, the method includes: sending first confirmation information to the source node based on the handover command, where the first confirmation information is used to confirm whether the handover command is received. After the step 42, the method further includes: sending to the source node and/or the target node second confirmation information indicating that the dual connectivity has been established. The second confirmation information is used to confirm whether the dual connectivity is successfully established.

After the step 43, the method further includes: sending a handover completed message to the target node, where the handover completed message is used to indicate at least one of the following: the SC configuration information has been applied, and handover completed. When receiving the handover completed message, the target node informs the source node that the SC configuration information takes effect and that the original DC configuration information may be deleted.

The method for dual connectivity handover according to some embodiments of this disclosure is briefly discussed above, and its further description is made below with reference to the accompanying drawings.

Figure 5A:
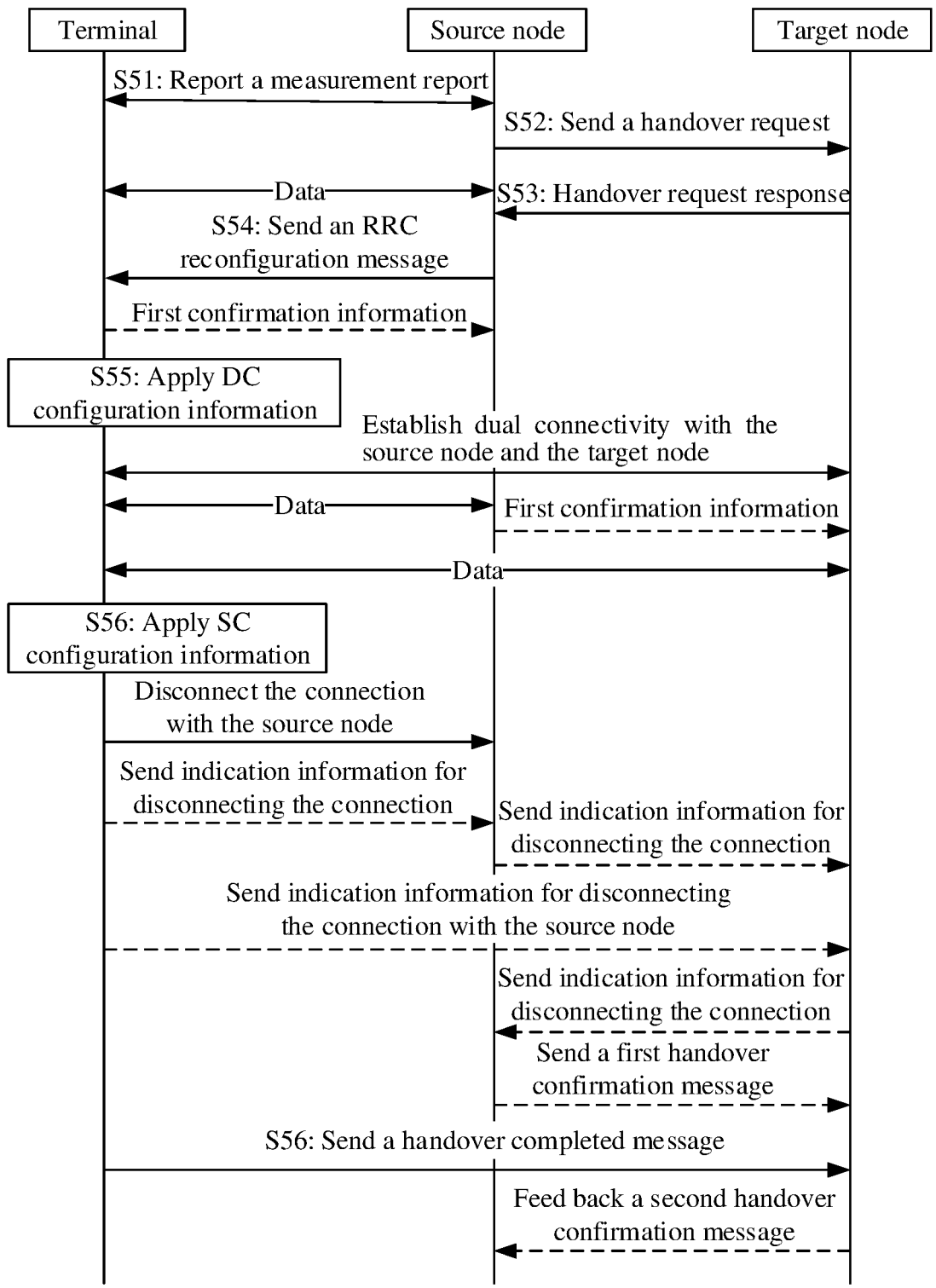
FIG. 5a is a schematic flowchart of a method for dual connectivity handover according to some embodiments of this disclosure.

As shown in FIG. 5*a*, the method for dual connectivity handover includes the following steps.

Step 51: A terminal wirelessly measures a wireless channel to a source node, and reports a measurement report to the source node.

Step 52: When the measurement report indicates that channel quality is bad, and a channel handover is required, the source node sends a handover request to a target node. The handover request carries configuration information for the source node in single connectivity and configuration information for the source node in dual connectivity. To be specific, the source node notifies the configuration of this node and the configuration of this node possibly desired in the DC to the target node.

Step 53: The source node receives a handover request response fed back from the target node, where the handover request response carries DC configuration information and SC configuration information. The target node generates configuration information in two parts based on the handover request sent by the source node (the configuration of this node and the configuration of this node possibly desired in the DC): DC configuration information to be used for a DC HO process, and SC configuration information to be used after access to the target cell.

Step 54: The source node sends to the terminal an RRC reconfiguration message which carries a handover command.

After the step 54, the terminal may send first confirmation information to the source node for confirming one or more of whether the terminal successfully receives the handover command, whether the DC configuration information is valid, whether the SC configuration information is valid, whether the dual connectivity is successfully established, and whether the SC configuration information is applied.

The terminal maintains a connection with the source node in and before the step 54, during which data transmission can be performed between the terminal and the source node.

Step 55: The terminal applies the DC configuration information to establish dual connectivity with the source node and the target node. In this case, the terminal maintains a connection with the source node, and data transmission can be performed between the terminal and the source node. A connection between the terminal and the target node is also maintained, and data transmission can also be performed between the terminal and the target node.

Step 56: The terminal applies the SC configuration information to disconnect the connection with the source node and only maintains the connection with the target node.

Optionally, the terminal may send indication information for disconnecting the connection to the source node; and the source node may send to the target node the indication information for disconnecting the connection.

Alternatively, the terminal may send indication information for disconnecting the connection with the source node to the target node, and the target node may send to the source node the indication information for disconnecting the connection.

Figure 5B:
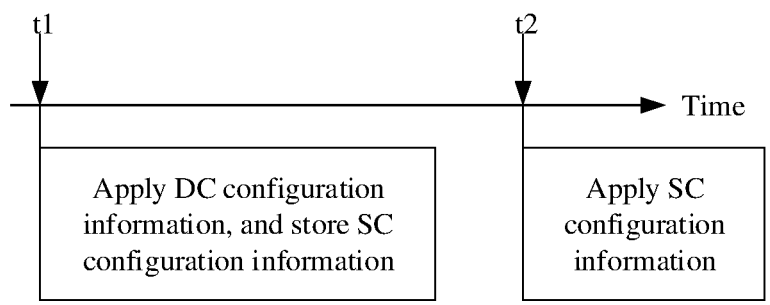
FIG. 5b is a schematic timing diagram of DC configuration information and SC configuration information in a handover command.

It should be noted that after the step 54, that is, after the terminal receives the RRC reconfiguration message, the terminal may immediately apply the DC configuration information and store the SC configuration information. For example, the SC configuration information for the target node may be packed in a message in a form of a container (or by using an explicit information element, the information element mainly including physical layer, layer 2, and layer 3 configurations for the SC). After the dual connectivity with the source node and the target node is established, the terminal applies the SC configuration information to disconnect the connection with the source node and only maintains the connection with the target node. As shown in FIG. 5b, the terminal successfully receives and demodulates the RRC reconfiguration message at a moment t1, immediately applies the DC configuration information to establish dual connectivity, and store the SC configuration information. At a moment t2 after the establishment of the dual connectivity is completed, the terminal applies the SC configuration to disconnect the connection with the source node, and completes the process of handing over to the target node.

Step 57: The terminal sends a handover completed message to the target node.

In the method for dual connectivity handover according to some embodiments of this disclosure, in the handover process, the terminal first establishes dual connectivity with the source node and the target node based on the DC configuration information, and then disconnects the connection with the source node in the dual connectivity based on the SC configuration information to change to maintain a single connection with the target node. In this way, connection configuration in the DC HO process can be supported, and the DC HO process can proceed normally, thereby meeting the 0 ms delay requirement of the terminal during terminal movement.

The method for dual connectivity handover in different scenarios is described in the foregoing embodiments. The following further describes a terminal corresponding to the method with reference to an accompanying drawing.

Figure 6:
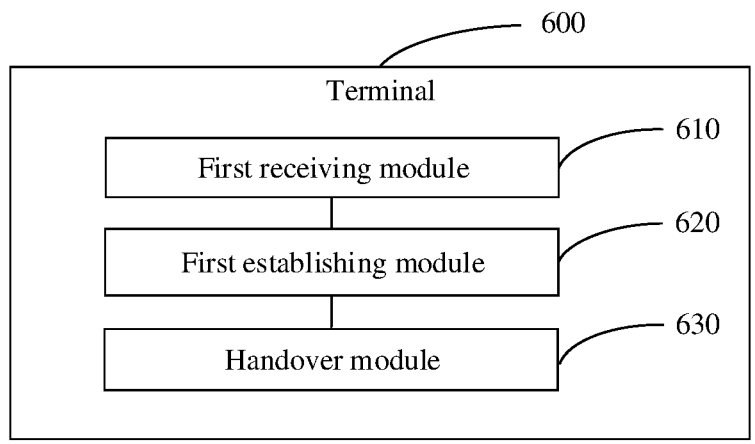
FIG. 6 is a schematic modular structural diagram of a terminal according to some embodiments of this disclosure.

As shown in FIG. 6, a terminal 600 according to some embodiments of this disclosure can implement details of the method in the foregoing embodiment and achieve the same effects: receiving a handover command sent from a source node, where the handover command carries dual connectivity DC configuration information for the source node and a target node, and single connectivity SC configuration information for the target node; when the DC configuration information is supported, establishing dual connectivity with the source node and the target node based on the DC configuration information; and based on the SC configuration information, disconnecting the connection with the source node in the dual connectivity and maintaining a single connection with the target node. The terminal 600 specifically includes the following functional modules:

a first receiving module 610, configured to receive a handover command sent from a source node, where the handover command carries dual connectivity DC configuration information for the source node and a target node, and single connectivity SC configuration information for the target node;
  a first establishing module 620, configured to establish dual connectivity with the source node and the target node based on the DC configuration information; and
  a handover module 630, configured to, based on the SC configuration information, disconnect the connection with the source node and maintain a single connection with the target node.

The terminal 600 further includes:
  a first sending module, configured to, when the DC configuration information is not supported, send to the source node a rejection message indicating that the DC configuration information is rejected, so that the source node performs, based on the rejection message, a procedure for single connectivity handover.

The terminal 600 further includes:
  a second sending module, configured to send first confirmation information to the source node based on the handover command, where the first confirmation information is used to confirm at least one of the following:
  whether the handover command is received,
  whether the DC configuration information is valid,
  whether the SC configuration information is valid,
  whether the dual connectivity is established, and
  whether the SC configuration information is applied.

The terminal further includes:
  a third sending module, configured to send to the source node and/or the target node second confirmation information indicating that the dual connectivity has been established.

The terminal 600 further includes:
  a fourth sending module, configured to send a handover completed message to the target node, where the handover completed message is used to indicate at least one of the following:
  the SC configuration information has been applied, and
  handover completed.

The handover command is carried in a radio resource control RRC reconfiguration message. The RRC reconfiguration message has a first transaction identifier.

The DC configuration information and/or the SC configuration information in the handover command has a second transaction identifier which is different from the first transaction identifier.

It should be noted that, in the handover process, the terminal according to some embodiments of this disclosure first establishes dual connectivity with the source node and the target node based on the DC configuration information, and then disconnects the connection with the source node in the dual connectivity based on the SC configuration information to change to a single connection with the target node. In this way, connection configuration in the DC HO process can be supported, and the DC HO process can proceed normally, thereby meeting the 0 ms delay requirement of the terminal during terminal movement.

Figure 7:
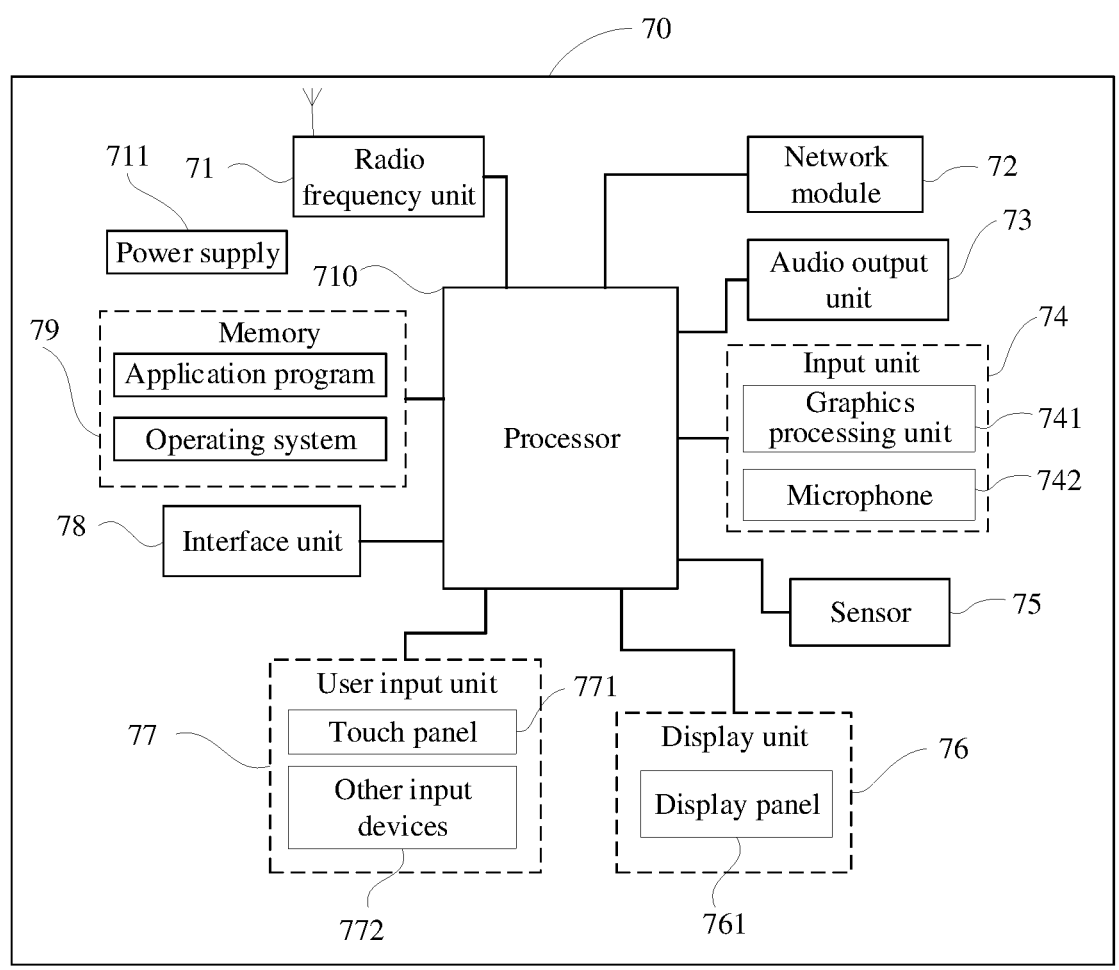
FIG. 7 is a block diagram of a terminal according to some embodiments of this disclosure.

To better achieve the foregoing objective, further, FIG. 7 is a schematic diagram of a hardware structure of a terminal for implementing each embodiment of this disclosure. The terminal 70 includes but is not limited to components such as a radio frequency unit 71, a network module 72, an audio output unit 73, an input unit 74, a sensor 75, a display unit 76, a user input unit 77, an interface unit 78, a memory 79, a processor 710, and a power supply 711. It can be understood by a person skilled in the art that the structure of the terminal shown in FIG. 7 does not constitute a limitation on the terminal. The terminal may include more or fewer components than those shown in the figure, or some components are combined, or component arrangements are different. In some embodiments of this disclosure, the terminal includes but is not limited to a mobile phone, a tablet computer, a laptop computer, a palmtop computer, an in-vehicle terminal, a wearable device, a pedometer, and the like.

The radio frequency unit 71 is configured to receive a handover command sent from a source node, where the handover command carries dual connectivity DC configuration information for the source node and a target node, and single connectivity SC configuration information for the target node.

The processor 710 is configured to, when the DC configuration information is supported, establish dual connectivity with the source node and the target node based on the DC configuration information; and based on the SC configuration information, disconnect the connection with the source node in the dual connectivity and maintain a single connection with the target node.

In the handover process, the terminal according to some embodiments of this disclosure first establishes dual connectivity with the source node and the target node based on the DC configuration information, and then disconnects the connection with the source node in the dual connectivity based on the SC configuration information to change to a single connection with the target node. In this way, connection configuration in the DC HO process can be supported, and the DC HO process can proceed normally, thereby meeting the 0 ms delay requirement of the terminal during terminal movement.

It should be understood that, in some embodiments of this disclosure, the radio frequency unit 71 may be configured to send or receive a signal in an information sending/receiving or call process. Specifically, the radio frequency unit 71 receives downlink data from a base station and sends the downlink data to the processor 710 for processing; and sends uplink data to the base station. Generally, the radio frequency unit 71 includes but is not limited to an antenna, at least one amplifier, a transceiver, a coupler, a low noise amplifier, a duplexer, and the like. In addition, the radio frequency unit 71 may further communicate with a network and another device through a wireless communications system.

The terminal provides wireless broadband internet access for a user by using the network module 72, for example, helps the user send and receive e-mails, browse web pages, and access streaming media.

The audio output unit 73 may convert audio data received by the radio frequency unit 71 or the network module 72 or stored in the memory 79 into an audio signal and output the audio signal as a sound. In addition, the audio output unit 73 may further provide audio output (for example, a call signal reception tone or a message reception tone) that is related to a specific function performed by the terminal 70. The audio output unit 73 includes a speaker, a buzzer, a telephone receiver, and the like.

The input unit 74 is configured to receive an audio or video signal. The input unit 74 may include a graphics processing unit (GPU) 741 and a microphone 742, and the graphics processing unit 741 processes image data of a still picture or a video obtained by an image capture apparatus (for example, a camera) in an image capture mode or a video capture mode. A processed image frame may be displayed on the display unit 76. An image frame processed by the graphics processing unit 741 may be stored in the memory 79 (or another storage medium) or sent by the radio frequency unit 71 or the network module 72. The microphone 742 can receive a sound and can process the sound into audio data. The processed audio data can be converted, for outputting, into a format that can be sent to a mobile communication base station through the radio frequency unit 71 in a telephone call mode.

The terminal 70 further includes at least one sensor 75, for example, an optical sensor, a motion sensor, and another sensor. Specifically, the optical sensor includes an ambient light sensor and a proximity sensor. The ambient light sensor may adjust brightness of a display panel 761 based on intensity of ambient light. When the terminal 70 moves near an ear, the proximity sensor may disable the display panel 761 and/or backlight. As a motion sensor, an accelerometer sensor may detect for a value of an acceleration in various directions (there are usually three axes), may detect for a value and a direction of gravity when the terminal is static, and may be configured to recognize a posture of the terminal (for example, landscape/portrait mode switching, a related game, or magnetometer posture calibration), provide a function related to vibration recognition (for example, a pedometer or a keystroke), or the like. The sensor 75 may further include a fingerprint sensor, a pressure sensor, an iris sensor, a molecular sensor, a gyroscope, a barometer, a hygrometer, a thermometer, or an infrared sensor. Details are not described herein.

The display unit 76 is configured to display information input by the user or information provided for the user. The display unit 76 may include a display panel 761, and the display panel 761 may be configured in the form of a liquid crystal display (LCD), an organic light-emitting diode (OLED), or the like.

The user input unit 77 may be configured to receive input digit or character information, and generate a key signal input related to a user setting and function control of the terminal. Specifically, the user input unit 77 includes a touch panel 771 and other input devices 772. The touch panel 771, also referred to as a touchscreen, may capture a touch operation performed by a user on or near the touch panel (for example, an operation performed by the user on the touch panel 771 or near the touch panel 771 by using any appropriate object or accessory such as a finger or a stylus). The touch panel 771 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 710, and receives and executes a command sent by the processor 710. In addition, the touch panel 771 may be implemented in a plurality of forms, for example, as a resistive, capacitive, infrared, or surface acoustic wave touch panel. The user input unit 77 may further include other input devices 772 in addition to the touch panel 771. Specifically, the other input devices 772 may include but are not limited to a physical keyboard, a function key (such as a volume control key or a power on/off key), a trackball, a mouse, a joystick, and the like. Details are not described herein.

Further, the touch panel 771 may cover the display panel 761. After detecting a touch operation on or near the touch panel 771, the touch panel 771 transmits the touch operation to the processor 710 to determine a type of a touch event. Then the processor 710 provides corresponding visual output on the display panel 761 based on the type of the touch event. In FIG. 7, the touch panel 771 and the display panel 761 serve as two independent components to implement input and output functions of the terminal. However, in some embodiments, the touch panel 771 and the display panel 761 may be integrated to implement the input and output functions of the terminal. This is not specifically limited herein.

The interface unit 73 is an interface for connecting an external apparatus to the terminal 70. For example, the external apparatus may include a wired or wireless headphone port, an external power (or battery charger) port, a wired or wireless data port, a memory card port, a port for connecting an apparatus having a recognition module, an audio input/output (I/O) port, a video I/O port, an earphone port, and the like. The interface unit 73 may be configured to receive input (for example, data information and electric power) from the external apparatus, and transmit the received input to one or more elements in the terminal 70; or may be configured to transmit data between the terminal 70 and the external apparatus.

The memory 79 may be configured to store a software program and various data. The memory 79 may mainly include a program storage area and a data storage area. The program storage area may store an operating system, an application program required for at least one function (such as a sound play function and an image play function), and the like. The data storage area may store data (such as audio data and a phone book) created based on use of a mobile phone, and the like. In addition, the memory 79 may include a high-speed random access memory, or may include a non-volatile memory, for example, at least one magnetic disk storage device, a flash memory device, or other volatile solid-state storage devices.

The processor 710 is a control center of the terminal, connects various parts of the entire terminal by using various interfaces and lines, and executes various functions and data processing of the terminal by running or executing a software program and/or a module stored in the memory 79 and invoking data stored in the memory 79, so as to perform overall monitoring on the terminal. The processor 710 may include one or more processing units. Optionally, the processor 710 may integrate an application processor and a modem processor. The application processor mainly processes an operating system, a user interface, an application program, and the like. The modem processor mainly processes wireless communication. It may be understood that the modem processor may alternatively not be integrated into the processor 710.

The terminal 70 may further include a power supply 711 (for example, a battery) that supplies power to each component. Optionally, the power supply 711 may be logically connected to the processor 710 by using a power management system, so as to implement functions such as charging management, discharging management, and power consumption management by using the power management system.

In addition, the terminal 70 includes some functional modules that are not shown. Details are not described herein.

Optionally, some embodiments of this disclosure further provide a terminal, including: a processor 710, a memory 79, and a computer program that is stored in the memory 79 and capable of running on the processor 710. When the computer program is executed by the processor 710, the processes in the foregoing embodiments of the method for dual connectivity handover are implemented, with the same technical effect achieved. To avoid repetition, details are not described herein again. The terminal may be a wireless terminal or a wired terminal. The wireless terminal may be a device providing a user with voice and/or other service data connectivity, a handheld device having a wireless connection function, or another processing device connected to a wireless modem. The wireless terminal may communicate with one or more core networks through a radio access network (RAN). The wireless terminal may be a mobile terminal such as a mobile phone (also referred to as a "cellular" phone) or a computer having a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile terminal (Mobile), a remote station, a remote terminal, an access terminal, a user terminal, a user agent, or a user device (or User Equipment). This is not limited herein.

Some embodiments of this disclosure further provide a computer-readable storage medium, where the computer-readable storage medium stores a computer program. When the computer program is executed by a processor, the processes in the foregoing embodiments of the method for dual connectivity handover are implemented, with the same technical effect achieved. To avoid repetition, details are not described again herein. For example, the computer-readable storage medium is a read-only memory (ROM), a random access memory (RAM), a magnetic disk, an optical disk, or the like.

The method for dual connectivity handover in this disclosure is described from the perspective of the terminal side in the foregoing embodiment. A method for dual connectivity handover is further described from the perspective of a network device side in the following embodiment with reference to an accompanying drawing.

As shown in FIG. 8, a method for dual connectivity handover according to some embodiments of this disclosure is applied to a network device side, where the network device is a source node, and the method includes the following step.

Step 81: Send a handover command to a terminal, where the handover command carries dual connectivity DC configuration information for a source node and a target node, and single connectivity SC configuration information for the target node.

When the source node is a source base station, the target node may be a target base station. When the source node is a source SN or MN in the DC, the target node may be a target SN in the DC. The handover command is carried in a radio resource control RRC reconfiguration message. The RRC reconfiguration message has a first transaction identifier (transaction ID). The first transaction identifier is an ID of the RRC reconfiguration message. Further, the DC configuration information and/or the SC configuration information in the handover command has a second transaction identifier which is different from the first transaction identifier. To be specific, the DC configuration information and the SC configuration information may have respective second transaction identifiers, or share one second transaction identifier. The second transaction identifier is different from the first transaction identifier of the RRC reconfiguration message.

Before the step 81, the method further includes: sending a handover request to the target node and receiving a handover request response fed back from the target node. The handover request carries configuration information for the source node in single connectivity and configuration information for the source node in dual connectivity. The handover request response carries the DC configuration information and the SC configuration information. The target node generates configuration information in two parts based on the handover request sent by the source node (the configuration of this node and the configuration of this node possibly desired in the DC): DC configuration information to be used for a DC HO process, and SC configuration information to be used after access to the target cell.

After the step 81, the method further includes: receiving a rejection message sent from the terminal, and based on the rejection message, performing a procedure for single connectivity handover. The rejection message is used to indicate that the terminal rejects the DC configuration information. After the terminal receives the handover command, the terminal may not support the DC configuration information due to its own capability or other reasons, so the terminal sends to the source node a rejection message indicating that the DC configuration information is rejected. After receiving the rejection message, the source node may perform a procedure for single connectivity handover, that is, a traditional handover procedure.

After the step 81, the method further includes: receiving first confirmation information sent from the terminal, where the first confirmation information is used to confirm at least one of the following:
whether the handover command is received,
whether the DC configuration information is valid,
whether the SC configuration information is valid,
whether the dual connectivity is established, and
whether the SC configuration information is applied.

The first confirmation information may confirm only one of the above information, or the first confirmation information may also jointly confirm any combination of the above information. It should be noted that for different information that may be confirmed by the first confirmation information, their feedback occasions are different. For example, when the first confirmation information only confirms whether the handover command is received, an occasion for sending the first confirmation information occurs after the step 81. When the first confirmation information is used to jointly confirm whether the handover command is received and whether the dual connectivity is established, an occasion for sending the first confirmation information occurs after the terminal has established the dual connectivity with the source node and the target node.

After the step of receiving first confirmation information sent from the terminal, the method further includes: sending a first handover confirmation message to the target node (confirmation forwarded); and receiving a second handover confirmation message fed back from the target node based on the first handover confirmation message.

In addition to the foregoing joint confirmation by the first confirmation information, a variety of the above information may be confirmed through their respective confirmation information. After the step 81, the method further includes: receiving, from the terminal, first confirmation information that is used to indicate that the handover command is received; and after the terminal has established the dual connectivity with the source node and the target node, receiving, from the terminal or the target node, second confirmation information that is used to indicate that the dual connectivity has been established.

In the method for dual connectivity handover according to some embodiments of this disclosure, the source node sends to the terminal the handover command carrying the DC configuration information and the SC configuration information, so that in the handover process, the terminal first establishes dual connectivity with the source node and the target node based on the DC configuration information, and then disconnects the connection with the source node in the dual connectivity based on the SC configuration information to change to a single connection with the target node. In this way, connection configuration in the DC HO process can be supported, and the DC HO process can proceed normally, thereby meeting the 0 ms delay requirement of the terminal during terminal movement.

The method for dual connectivity handover in different scenarios is separately described in detail in the foregoing embodiments. A network device corresponding to the method for dual connectivity handover is further described in the following embodiment with reference to an accompanying drawing.

As shown in FIG. 9, a network device 900 according to some embodiments of this disclosure can implement details of the method in the foregoing embodiments and achieve the same effects: sending a handover command to a terminal, where the handover command carries dual connectivity DC configuration information for a source node and a target node, and single connectivity SC configuration information for the target node. The network device 900 specifically includes the following functional modules:
  a fifth sending module 910, configured to send a handover command to a terminal, where the handover command carries dual connectivity DC configuration information for a source node and a target node, and single connectivity SC configuration information for the target node.

The network device 900 further includes:
  a sixth sending module, configured to send a handover request to the target node, where the handover request carries configuration information for the source node in single connectivity and configuration information for the source node in dual connectivity; and
  a second receiving module, configured to receive a handover request response fed back from the target node, where the handover request response carries the DC configuration information and the SC configuration information.

The network device 900 further includes:
  a third receiving module, configured to receive a rejection message sent from the terminal, where the rejection message is used to indicate that the terminal rejects the DC configuration information; and
  a processing module, configured to, based on the rejection message, perform a procedure for single connectivity handover.

The network device 900 further includes:

a fourth receiving module, configured to receive first confirmation information sent from the terminal, where the first confirmation information is used to confirm at least one of the following:

whether the handover command is received,
whether the DC configuration information is valid,
whether the SC configuration information is valid,
whether the dual connectivity is established, and
whether the SC configuration information is applied.

The network device 900 further includes:

a seventh sending module, configured to send a first handover confirmation message to the target node; and
a fifth receiving module, configured to receive a second handover confirmation message fed back from the target node based on the first handover confirmation message.

The network device 900 further includes:

a sixth receiving module, configured to receive, from the terminal or the target node, second confirmation information that is used to indicate that the dual connectivity has been established.

It should be noted that in some embodiments of this disclosure, the source node sends to the terminal the handover command carrying the DC configuration information and the SC configuration information, so that in the handover process, the terminal first establishes dual connectivity with the source node and the target node based on the DC configuration information, and then disconnects the connection with the source node in the dual connectivity based on the SC configuration information to change to a single connection with the target node. In this way, connection configuration in the DC HO process can be supported, and the DC HO process can proceed normally, thereby meeting the 0 ms delay requirement of the terminal during terminal movement.

It should be understood that division of modules of the network device and the terminal is merely logical function division. The modules may be all or partially integrated in a physical entity or may be separated physically in an actual implementation. In addition, the modules may be all implemented in a form of software invoked by a processing component, or may be all implemented in a form of hardware; or some of the modules may be implemented in a form of software invoked by a processing component, and some of the modules may be implemented in a form of hardware. For example, a determining module may be a processing component that is separately disposed, or may be integrated in a chip of the apparatus for implementation. In addition, the determining module may be stored in the memory of the apparatus in a form of program code, and is invoked by a processing component of the apparatus to perform a function of the determining module. Implementation of other modules is similar to this. In addition, all or some of the modules may be integrated, or may be implemented independently. Herein, the processing component may be an integrated circuit, and has a signal processing capability. In an implementation process, the steps in the foregoing method or the foregoing modules may be implemented by using an integrated logic circuit of hardware of the processor component or by using instructions in a form of software.

For example, the modules above may be one or more integrated circuits configured to implement the foregoing method, for example, one or more application-specific integrated circuits (ASIC), or one or more microprocessors (digital signal processor, DSP), or one or more field programmable gate arrays (FPGA). For another example, when one of the foregoing modules is implemented in a form of program code invoked by a processing component, the processing component may be a general-purpose processor, for example, a central processing unit (CPU) or another processor that may invoke program code. For another example, the modules may be integrated in a form of a system-on-a-chip (SOC) for implementation.

To better achieve the foregoing objective, an embodiment of this disclosure further provides a network device. The network device includes a processor, a memory, and a computer program stored in the memory and capable of running on the processor. When the computer program is executed by the processor, the steps of the foregoing method for dual connectivity handover are implemented. An embodiment of this disclosure further provides a computer-readable storage medium, where the computer-readable storage medium stores a computer program, and when the computer program is executed by a processor, the steps of the foregoing method for dual connectivity handover are implemented.

Specifically, an embodiment of this disclosure further provides a network device. As shown in FIG. 10, the network device 1000 includes an antenna 101, a radio frequency apparatus 102, and a baseband apparatus 103. The antenna 101 is connected to the radio frequency apparatus 102. In an uplink direction, the radio frequency apparatus 102 receives information by using the antenna 101, and sends the received information to the baseband apparatus 103 for processing. In a downlink direction, the baseband apparatus 103 processes to-be-sent information, and sends the information to the radio frequency apparatus 102; and the radio frequency apparatus 102 processes the received information and then transmits the information by using the antenna 101.

The frequency band processing apparatus may be located in the baseband apparatus 103. The method performed by the network device in the foregoing embodiment may be implemented by the baseband apparatus 103, and the baseband apparatus 103 includes a processor 104 and a memory 105.

The baseband apparatus 103 may include, for example, at least one baseband processing unit, where a plurality of chips are disposed on the baseband processing unit. As shown in FIG. 10, one of the chips is, for example, the processor 104, connected to the memory 105, to invoke the program in the memory 105 to perform the operations of the network device shown in the foregoing method embodiment.

The baseband apparatus 103 may further include a network interface 106, configured to exchange information with the radio frequency apparatus 102, where the interface is, for example, a common public radio interface (CPRI).

The processor herein may be one processor, or may be a collective term for a plurality of processing components. For example, the processor may be a CPU, or may be an ASIC, or may be one or more integrated circuits configured to implement the method performed by the network device, for example, one or more microprocessors DSPs, or one or more field programmable gate arrays FPGAs. A storage component may be a memory, or may be a collective term for a plurality of storage components.

The memory 105 may be a volatile memory or a non-volatile memory, or may include a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which is used as an external cache. By way of example but not restrictive description, many forms of RAMs may be used, for example, a static random access memory (SRAM), a dynamic random access memory (DRAM), a synchronous dynamic random access memory (SDRAM), a double data rate synchronous dynamic random access memory (DDRS-DRAM), an enhanced synchronous dynamic random access memory (ESDRAM), a synchronous link dynamic random access memory (Synchlink DRAM, SLDRAM), and a direct rambus random access memory (DRRAM). The memory 105 described in this application is intended to include but is not limited to these and any other suitable types of memories.

Specifically, the network device in some embodiments of this disclosure further includes a computer program stored in the memory 105 and capable of running on the processor 104. The processor 104 invokes the computer program in the memory 105 to perform the method performed by the modules shown in FIG. 8.

Specifically, when being invoked by the processor 104, the computer program may be configured to send a handover command to a terminal, where the handover command carries dual connectivity DC configuration information for the source node and a target node, and single connectivity SC configuration information for the target node. The network device may be a base transceiver station (BTS) in a global system for mobile communications (GSM) or code division multiple access (CDMA), or may be a NodeB (NB) in wideband code division multiple access (WCDMA), or may be an evolved NodeB (eNB or eNodeB), a relay station, or an access point in LTE, or may be a base station in a future 5G network, or the like, which is not limited herein.

In some embodiments of this disclosure, the source node sends to the terminal the handover command carrying the DC configuration information and the SC configuration information, so that in the handover process, the terminal first establishes dual connectivity with the source node and the target node based on the DC configuration information, and then disconnects the connection with the source node in the dual connectivity based on the SC configuration information to change to a single connection with the target node. In this way, connection configuration in the DC HO process can be supported, and the DC HO process can proceed normally, thereby meeting the 0 ms delay requirement of the terminal during terminal movement.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the embodiments provided in this application, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to related technologies, or some of the technical solutions may be embodied in a form of a software product. The computer software product is stored in a storage medium, and includes instructions for enabling a computer device (which may be a personal computer, a server, a network device, or the like) to perform all or some of the steps of the methods described in the embodiments of this disclosure. The foregoing storage medium includes: any medium that can store program code, such as a USB flash drive, a removable hard disk, a ROM, a RAM, a magnetic disk, or an optical disc.

In addition, it should be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence, and some steps may be performed in parallel or independently. A person of ordinary skill in the art can understand that all or any steps or components of the method and apparatus in this disclosure may be implemented by hardware, firmware, software, or a combination thereof in any computing apparatus (including a processor, a storage medium, and the like) or a network of computing apparatuses. This can be implemented as long as a person of ordinary skill in the art applies basic programming skill after reading the specification of this disclosure.

Therefore, an objective of this disclosure may also be achieved by running a program or a group of programs on any computing apparatus. The computing apparatus may be a well-known general apparatus. Therefore, the objective of this disclosure may also be achieved by merely providing a program product including program code for implementing the method or apparatus. To be specific, the program product also constitutes this disclosure, and a storage medium storing the program product also constitutes this disclosure. Apparently, the storage medium may be any well-known storage medium or any storage medium that will be developed in the future. It should also be noted that in the apparatus and method of this disclosure, apparently, the components or steps may be decomposed and/or recombined. The decomposition and/or recombination should be considered as an equivalent solution of this disclosure. In addition, steps for performing the foregoing series of processing may be naturally performed in a sequence of description and in a time sequence, but do not need to be performed necessarily in the time sequence. Some steps may be performed in parallel or independently.

The foregoing descriptions are merely optional implementations of this disclosure. It should be noted that a person of ordinary skill in the art may make several improvements or polishing without departing from the principle of this disclosure and the improvements and polishing shall fall within the protection scope of this disclosure.

What is claimed is:

1. A method for dual connectivity handover from a source node to a target node, applied to a terminal side and comprising:
   receiving, by the terminal side not in dual connectivity, a handover command sent from the source node, wherein the handover command carries both dual connectivity DC configuration information for establishing a dual connectivity with the source node and the target node and single connectivity SC configuration information for establishing a single connectivity with the target node;
   determining, by the terminal side not in dual connectivity, whether the DC configuration information is supported by the terminal side;
   in case that the DC configuration information is supported by the terminal side, establishing, by the terminal side not in dual connectivity, dual connectivity with the source node and the target node based on the DC configuration information; and
   based on the SC configuration information, disconnecting, by the terminal side in the established dual connectivity with the source node and the target node, the connection with the source node in the dual connectivity and maintaining a single connection with the target node;
   wherein after the step of receiving, by the terminal side not in dual connectivity, a handover command sent from a source node, the method further comprises:
   sending, by the terminal side, first confirmation information to the source node based on the handover command, wherein the first confirmation information is used to confirm at least one of the following:
   whether the SC configuration information is valid,
   whether the SC configuration information is applied.

2. The method for dual connectivity handover according to claim 1, wherein after the step of receiving, by the terminal side not in dual connectivity, a handover command sent from a source node, the method further comprises:
   in case that the DC configuration information is not supported by the terminal side, sending, by the terminal side not in dual connectivity, to the source node a rejection message indicating that the DC configuration information is rejected, so that the source node performs, based on the rejection message, a procedure for single connectivity handover.

3. The method for dual connectivity handover according to claim 1,
   wherein the first confirmation information is further used to confirm at least one of the following:
   whether the handover command is received,
   whether the DC configuration information is valid,
   whether the dual connectivity is established.

4. The method for dual connectivity handover according to claim 1, wherein after the step of establishing, by the terminal side not in dual connectivity, dual connectivity with the source node and the target node based on the DC configuration information, the method further comprises:
   sending, by the terminal side in the established dual connectivity with the source node and the target node, second confirmation information indicating that the dual connectivity has been established to the source node and/or the target node.

5. The method for dual connectivity handover according to claim 1, wherein after the step of based on the SC configuration information, disconnecting, by the terminal side in the established dual connectivity with the source node and the target node, the connection with the source node in the dual connectivity and maintaining a single connection with the target node, the method further comprises:
   sending, by the terminal side, a handover completed message to the target node, wherein the handover completed message is used to indicate at least one of the following:
   the SC configuration information has been applied, and
   handover completed.

6. The method for dual connectivity handover according to claim 1, wherein the handover command is carried in a radio resource control RRC reconfiguration message, and the RRC reconfiguration message has a first transaction identifier.

7. The method for dual connectivity handover according to claim 6, wherein the DC configuration information and/or the SC configuration information have/has a second transaction identifier, the second transaction identifier being different from the first transaction identifier.

8. A terminal, wherein the terminal comprises a processor, a memory, and a computer program stored in the memory and running on the processor, wherein when the computer program is executed by the processor, a method for dual connectivity handover from a source node to a target node is implemented, and the method comprises:
   receiving, by the terminal not in dual connectivity, a handover command sent from the source node, wherein the handover command carries both dual connectivity DC configuration information for establishing a dual connectivity with the source node and the target node and single connectivity SC configuration information for establishing a single connectivity with the target node;
   determining, by the terminal not in dual connectivity, whether the DC configuration information is supported by the terminal;
   in case that the DC configuration information is supported by the terminal, establishing, by the terminal not in dual connectivity, dual connectivity with the source node and the target node based on the DC configuration information; and
   based on the SC configuration information, disconnecting, by the terminal in the established dual connectivity with the source node and the target node, the connection with the source node in the dual connectivity and maintaining a single connection with the target node;
   wherein after the step of receiving, by the terminal side not in dual connectivity, a handover command sent from a source node, the method further comprises:

sending, by the terminal side, first confirmation information to the source node based on the handover command, wherein the first confirmation information is used to confirm at least one of the following:
whether the SC configuration information is valid,
whether the SC configuration information is applied.

9. The terminal according to claim 8, wherein after the step of receiving, by the terminal not in dual connectivity, a handover command sent from a source node, the method further comprises:
in case that the DC configuration information is not supported by the terminal, sending, by the terminal not in dual connectivity, to the source node a rejection message indicating that the DC configuration information is rejected, so that the source node performs, based on the rejection message, a procedure for single connectivity handover.

10. The terminal according to claim 8,
wherein the first confirmation information is further used to confirm at least one of the following:
whether the handover command is received,
whether the DC configuration information is valid,
whether the dual connectivity is established.

11. A method for dual connectivity handover from a source node to a target node, applied to a network device, wherein the network device is the source node, and the method comprises:
sending, by the source node, a handover command to a terminal not in dual connectivity, wherein the handover command carries both dual connectivity DC configuration information for establishing a dual connectivity with the source node and the target node and single connectivity SC configuration information for establishing a single connectivity with the target node;
wherein after the step of sending, by the source node, a handover command to a terminal not in dual connectivity, the method further comprises:
receiving, by the source node, first confirmation information sent from the terminal, wherein the first confirmation information is used to confirm at least one of the following:
whether the SC configuration information is valid,
whether the SC configuration information is applied.

12. The method for dual connectivity handover according to claim 11, wherein before the step of sending, by the source node, a handover command to a terminal not in dual connectivity, the method further comprises:
sending, by the source node, a handover request to the target node, wherein the handover request carries configuration information for the source node in single connectivity and configuration information for the source node in dual connectivity; and
receiving, by the source node, a handover request response fed back from the target node, wherein the handover request response carries the DC configuration information and the SC configuration information.

13. The method for dual connectivity handover according to claim 11, wherein after the step of sending, by the source node, a handover command to a terminal not in dual connectivity, the method further comprises:
receiving, by the source node, a rejection message sent from the terminal not in dual connectivity, wherein the rejection message is used to indicate that the terminal rejects the DC configuration information; and
based on the rejection message, performing, by the source node, a procedure for single connectivity handover.

14. The method for dual connectivity handover according to claim 11,
wherein the first confirmation information is further used to confirm at least one of the following:
whether the handover command is received,
whether the DC configuration information is valid,
whether the dual connectivity is established.

15. The method for dual connectivity handover according to claim 14, wherein after the step of receiving, by the source node, first confirmation information sent from the terminal, the method further comprises:
sending, by the source node, a first handover confirmation message to the target node; and
receiving, by the source node, a second handover confirmation message fed back from the target node based on the first handover confirmation message.

16. The method for dual connectivity handover according to claim 11, wherein after the step of sending, by the source node, a handover command to a terminal not in dual connectivity, the method further comprises:
receiving, by the source node, from the terminal or the target node, second confirmation information that is used to indicate that the dual connectivity has been established.

17. A network device, wherein the network device comprises a processor, a memory, and a computer program stored in the memory and running on the processor, wherein when the computer program is executed by the processor, the steps of the method for dual connectivity handover according to claim 11 are implemented.

18. The network device according to claim 17, wherein before the step of sending, by the source node, a handover command to a terminal not in dual connectivity, the method further comprises:
sending, by the source node, a handover request to the target node, wherein the handover request carries configuration information for the source node in single connectivity and configuration information for the source node in dual connectivity; and
receiving, by the source node, a handover request response fed back from the target node, wherein the handover request response carries the DC configuration information and the SC configuration information.

19. A non-transitory computer-readable storage medium, wherein the non-transitory computer-readable storage medium stores a computer program, and when the computer program is executed by a processor, the steps of the method for dual connectivity handover according to claim 1 are implemented.

20. A non-transitory computer-readable storage medium, wherein the non-transitory computer-readable storage medium stores a computer program, and when the computer program is executed by a processor, the steps of the method for dual connectivity handover according to claim 11 are implemented.

* * * * *